United States Patent
Engelhardt et al.

[15] 3,676,980
[45] July 18, 1972

[54] APPARATUS FOR WRAPPING BULKY OR STACKED OBJECTS

[72] Inventors: Walter Engelhardt, Stuttgart; Bruno Friedrich Bernhardt, Reutlingen-Betzingen, both of Germany

[73] Assignee: Carl Drohmann Gesellschaft mit beschrankter Haftung, Stuttgart-bad Connstatt, Germany

[22] Filed: June 12, 1970

[21] Appl. No.: 45,781

[30] Foreign Application Priority Data

June 16, 1969   Germany......................P 19 30 468.8

[52] U.S. Cl..................................53/183, 53/292, 53/386
[51] Int. Cl. .....................................B65b 1/02, B65b 43/30
[58] Field of Search....................53/183, 197, 241, 256, 292, 53/384, 386

[56] References Cited

UNITED STATES PATENTS 2,751,735   6/1956   Bartlett et al............................53/292
3,210,909   10/1965  Cochrane.............................53/241 X

*Primary Examiner*—Travis S. McGehee
*Attorney*—Cushman, Darby & Cushman

[57] ABSTRACT

An apparatus for wrapping bulky objects, or objects stacked on pallets, by which a continuous length of flattened foil tubing is positively gripped at its leading end, is opened out, and this open end is drawn down over the objects to envelop them, whereafter jaws are brought into action automatically to seal and sever the section of enwrapping foil from the parent stock.

7 Claims, 2 Drawing Figures

APPARATUS FOR WRAPPING BULKY OR STACKED OBJECTS

FIELD OF THE INVENTION.

This invention relates to an apparatus for wrapping bulky objects or objects which are stacked in groups on pallets.

DESCRIPTION OF PRIOR ART.

It is known to pull prefabricated bags of shrinkable foil manually over objects and then shrink the foil around the objects by the application of heat. This method of wrapping does not, however, lend itself to a high rate of output.

A wrapping apparatus has therefore been proposed consisting of a conveyor arrangement which comprises at least two parts which can be operated independently of one another and are arranged in tandem, a device for feeding in a continuous semi-tubular foil, a tunnel-shaped shoulder which opens downwards, is arranged after this feed device and above the first part of the conveyor arrangement, is suited to the cross section of the objects to be wrapped and, if appropriate, of the pallets below these objects, and is adapted for conducting and shaping the foil over the sides of the objects which extend parallel to the direction of travel of the conveyor arrangement, and a transverse welding and severing device having welding and severing tools which are movable towards one another with adjustable pressure in the zone between the first and second parts of the conveyor arrangement.

It is a primary disadvantage of apparatus of this character that rolls of foil of varying widths must be held on mountings so as to cater for differing heights of objects to be packaged. The changing over of foil rolls to cater for a changed format of objects is very time-consuming and necessitates a corresponding period of idleness for the apparatus. Moreover it is only possible, by using a considerable technical outlay, to apply the semi-tubular foil accurately around the objects in the apparatus referred to, and thus keep down the wastage of foil.

SUMMARY OF THE INVENTION.

To avoid the drawbacks recited above, the invention has been developed from an apparatus for wrapping bulky objects, or stacked groups of objects in packaging foils particularly those which are heat-shrinkable, which apparatus comprises a conveyor device for conveying the objects into the apparatus for temporary arrest therein, and a feed device for feeding in a continuous length of foil tubing. The invention now made in such a machine lies in the provision of a foil transporting means, arranged beneath said feed device, and having means for engaging the leading end of the infed foil tubing, for opening this end to a cross section greater than the corresponding area of the objects on the conveyor device, and for drawing the opened end of the tubing a pre-selectable amount over said objects, and comprising a foil transverse welding and severing device arranged after said feed device and having means for applying a transverse seam to the foil tubing above said objects and for severing said tubing above this transverse seam.

Further features of the invention are concerned with the contrivances whereby the transporting means performs its transporting travel in two steps and the transverse welding seam and severance of the foil tubing is performed between these two steps. Optionally the means engaging the leading end of the tubing may comprise two parallel bars with suction openings which are coupled, as known per se, via a control valve to a suction pump, or the means engaging the leading end of the tubing may be in the form of grippers which can be closed and opened in controlled fashion. The transporting means may be fastened to pairs of chains which are arranged in mirror image fashion at the middle of the conveyor device, are guided to run in parallel planes, and are drivable in controlled fashion, these pairs running at a small distance below the feed device and at a greater distance above the conveyor device, and are arranged laterally of objects standing on the conveyor device ready for wrapping and substantially vertical.

The aforesaid chains advantageously run beneath the feed device first downwards and apart and then temporarily towards one another, and the transverse welding and severing device is arranged in this locality.

Further features of the invention concern the control of the apparatus by specific switches and the means for drawing in the web of foil tubing.

In the apparatus according to the invention it is necessary to use foil tubing of contrasted dimensions only when changing from one size of pallet to another. Differing heights of objects require only different lengths of draw of the foil tubing from a supply reel. These variable lengths of draw are however easily and quickly selected by the adjustment of the position of electrical switches in the apparatus now proposed. Particularly in cases where the foil tubing has so-called side folds in its flattened condition, the wrappings which enclose the objects as a sack have an attractive appearance at their vertical sides.

BRIEF DESCRIPTION OF THE DRAWINGS.

An embodiment of the apparatus according to this invention will now be described with reference to the diagrammatic drawings accompanying this specification.

In these drawings.

Figure 1:
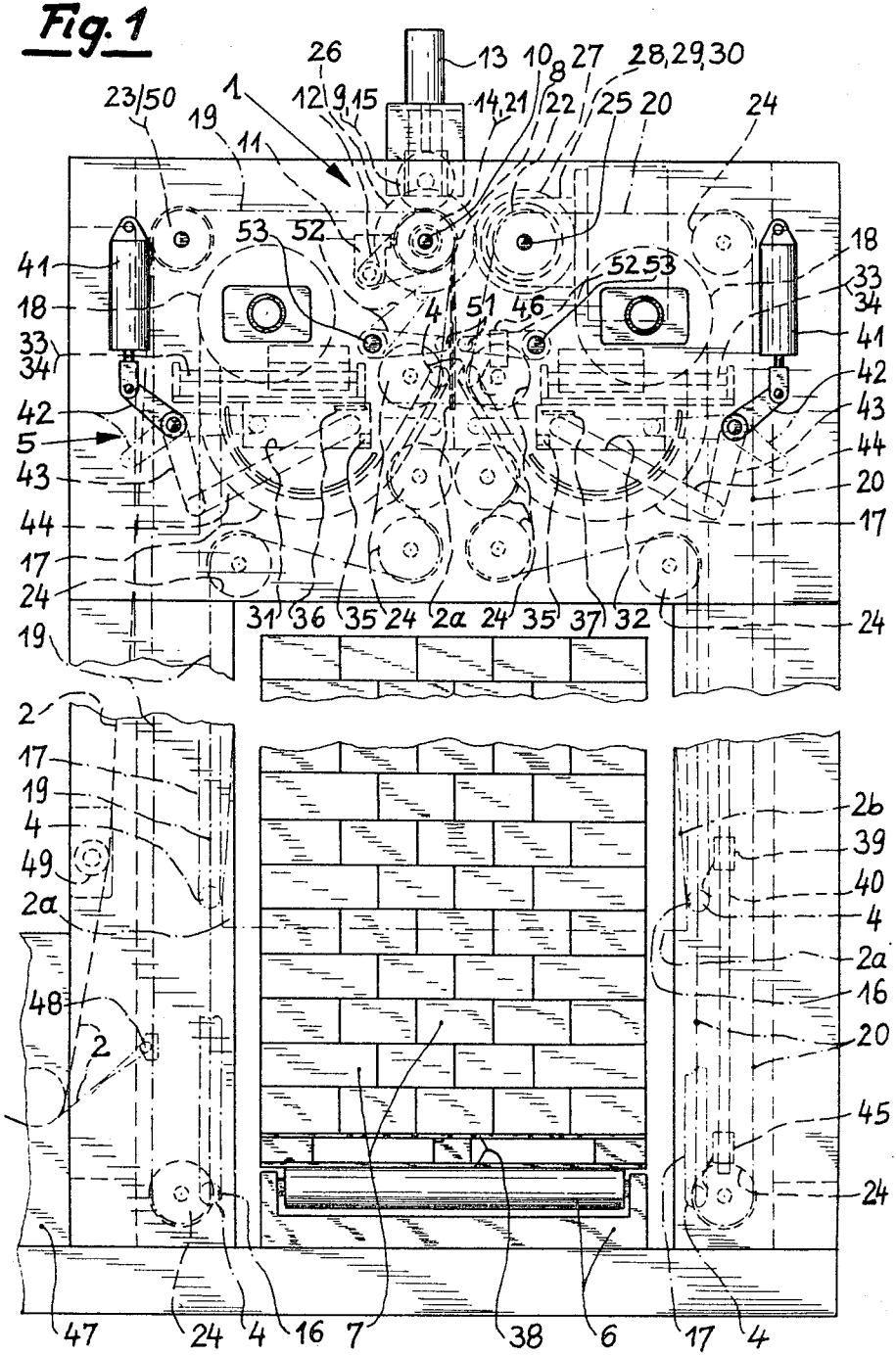
FIG. 1 is a front view of the wrapping apparatus, partly in section and partly cut away.
Figure 2:
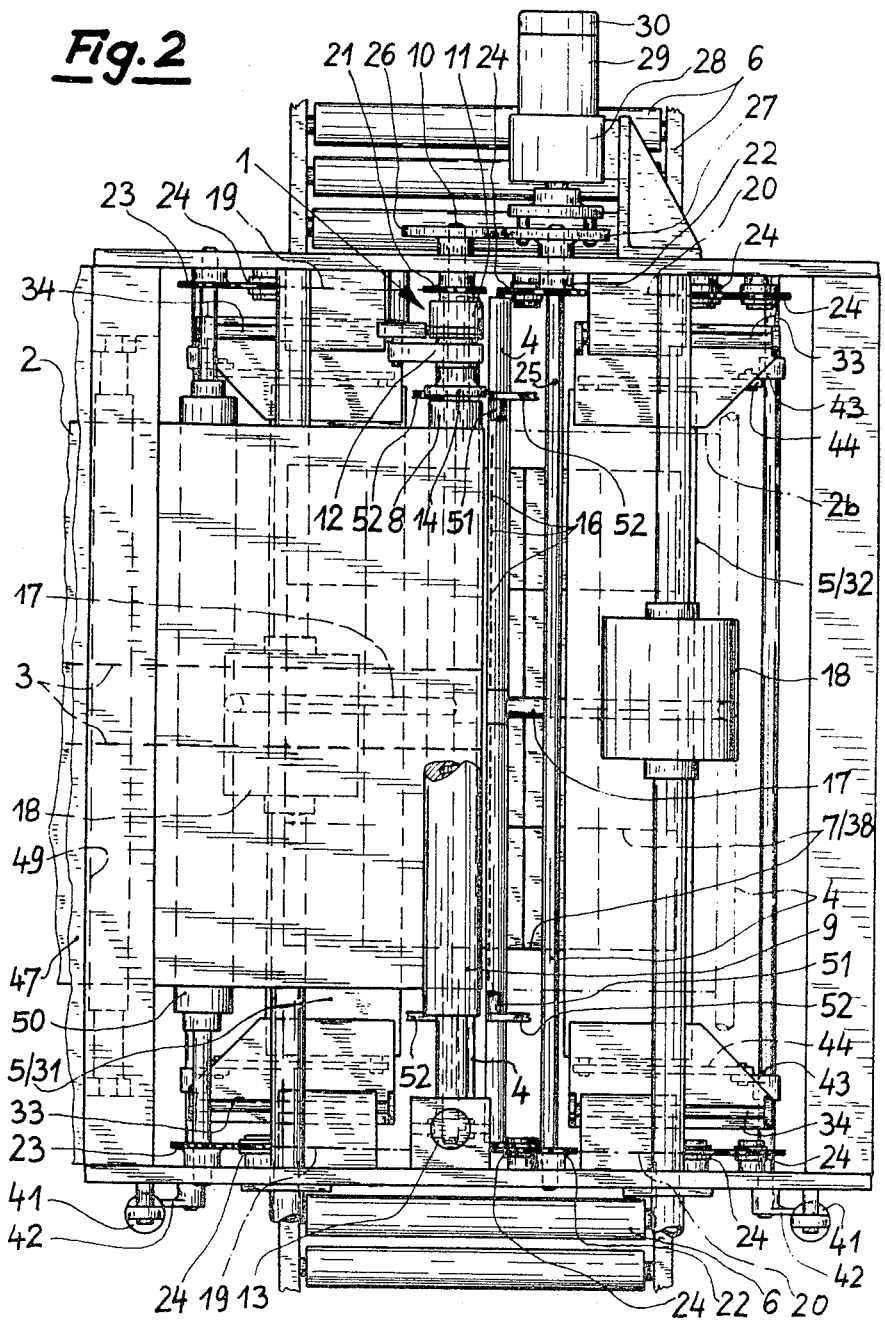
FIG. 2 is a plan view of the apparatus shown in FIG. 1.

DETAILED DESCRIPTION OF PREFERRED EMBODIMENT.

The wrapping apparatus illustrated primarily comprises a device 1 for feeding in endless foil tubing 2, which in its flattened condition may have side folds 3, a pair of transporting means 4 arranged beneath the feed device 1, a transverse welding and severing device 5 which is also arranged beneath the feed device 1, and a conveyor device 6 for the controlled conveyance to and from the apparatus of objects 7 which are to be wrapped.

The feed device 1 comprises two parallel draw rollers 8, 9. The roller 8 is rotatably mounted on a shaft 10 and is adapted to be coupled to this shaft 10 by an electromagnetic clutch 11. The draw roller 8 is moreover connected to a freewheel mechanism 12 so that it is only rotatable in the prescribed direction of transport. The second draw roller 9 can be pressed against the first-mentioned roller 8 by means of two operating cylinders 13 and is drivingly coupled thereto, advantageously through toothed wheels 14, 15.

The transporting means 4 are in the form of hollow bars which have suction openings 16 and are each connected by a flexible pipe 17 through a control valve (not shown) to a pump (also not shown). The ends of the pipes 17 away from the tubes 4 are fastened to automatically-operating winding up drums 18. The bars 4 are positioned parallel to the draw rollers 8, 9, being secured to chains 19, 20 arranged in pairs and driven by chain wheels 21, 22 and guided by further sprockets 23, 24. In their upper starting positions beneath the draw roller 8 the bars 4 are at a small distance from one another, and on circulation of chains 19 more apart in parallel planes and in the direction of conveyance by the draw rollers 8, 9 by an amount which is more than the total width of the object(s) to be wrapped, and then descend beside these latter.

The chain wheels 21 and 22 are respectively secured to the shaft 10 and to a further shaft 25 parallel to the latter. The shafts 10, 25 are drivingly coupled by interengaging toothed wheels 25, 27 and are driven in alternating directions of travel by a motor 29, with a built-in brake 30, and through a gearing 28.

The transverse welding and severing device 5 primarily comprises two jaws 31, 32 which are movable relatively to one another on rectilinear guides 33, 34 and have welding bars 35 and, above these, welding tools 36, 37 all as known in the art.

The wrapping of objects 7, which normally are stacked on pallets 38, is carried out as follows:

The objects to be wrapped are carried by the conveyor device 6 beneath the feed device 1 and arrested in appropriate location.

The foil tubing 2, which is conducted from a supply (not shown) between the draw rollers 8, 9 and terminates at the level of the transverse welding and separating device 5, is drawn by suction against the bars 4 and thereby opened at its leading end 2 an amount corresponding to the spacing of these bars. During this procedure the jaws 31, 32 are spaced from one another. When the leading end 2a of the foil is sucked against the bars 4, clutch 11 is operated, brake 30 released and motor 29 brought into action. As a result the foil tubing 2 is drawn off the supply by means of rollers 8, 9 and its leading end 2a is opened increasingly by the bars 4 during the transporting movement and finally closed over the objects 7.

During its descent one of the two bars finally, through a nose (not shown) on one chain, closes an electrical switch 39 which is adjustable heightwise on a mounting rail 40. The motor 29 is then switched off by switch 39 and braked. When the motor 29 has come to a standstill two operating cylinders 41, through the agency of levers 42, 43 and thrust rods 44, move the jaws 31, 32 of the transverse welding and severing device 5 against one another to provide the foil tubing 2 with a transverse weld seam and to sever it above this.

After the severance has taken place the jaws 32 of the device 5 are moved back to their starting position and the motor 29 is switched on again. When this switch-on has been effected clutch 11 is not operated and only the bars 4 move an draw the section 2b of the tube, which has been cut from the parent foil tubing 2 and transversely sealed at its upper end, completely over objects 7. A second switch 45 arranged on rail 40 below the first switch 39 interrupts the suction action of bars 4, switches the motor 29 on to operate in the opposite direction, whereby the bars 4 return to their upper starting position and switch in the conveyor device 6 to conduct the wrapped objects 7 away.

The fact that the transversely seam welded and off cut section 2b of tubing is drawn by the bars 4 fully over the objects 7 ensures that no more of the length of the foil tubing 2 is used than is absolutely necessary and that, to cater for a subsequent shrinkage of the wrapping around the objects 7 and the pallet 38, which may be used, a foil tubing 2 with only a comparatively small shrinkage capacity is necessary. Wrapping by the method described above is particularly advantageous, where the overall height of the objects on the pallet 38 is low, in achieving a smooth enveloping of the upper part of the stacked objects 7 by the severed length of tubing.

In instances where the objects 7 stand at a large overall height above the pallet 38 and thus reach the proximity of the transverse welding and severing device 5, the further lowering of the bars 4 after the separation of the transversely-welded section 2b of tubing, as described above, could be dispensed with. In this instance the first switch 39 would control the interruption of the suction effect and the return of the bars 4, such that the section 2b of tubing will then slide along and against the objects 7 under the action of gravity and would be drawn smoothly over the latter.

A further switch 46 provided above the transverse welding and severing device 5 switches the motor 29 off again when the bars 4 have approached the end 2a of the foil tubing 2 which hangs downwards from the draw rollers 8, 9. As soon as the next loaded pallet 38 has been brought into position at the feed device 1 by means of the conveyor device 6, the next wrapping operation is initiated.

During the period in which the clutch 11 is not engaged, the freewheel unit 12 prevents the foil tubing 2 from being drawn between the draw rollers 8, 9 by a web tension regulator of a prewinding arrangement 47 which may be provided, so that it will not be possible for it to be engaged by the bars 4 which have returned to their starting positions.

Before the wrapping apparatus is brought into service, to facilitate the introduction of the foil tubing 2, to be drawn from the supply source, between the draw rollers 8, 9, which are at a substantial height above the feed device 6, use may be made of a pilot rod 48 which is connected to the chains 19 and is parallel to the rollers 8, 9. The leading end 2a of a new length of foil tubing 2 may be fastened to this rod 48 and the same then moved by means of the motor 29 and the chains 19 past a first divert roller 49 and a second divert roller 50 in the direction of the draw rollers 8, 9. The rod 48 is conducted around the lower draw roller 8, while the upper roller 9 is raised, and is eventually arrested beneath the transverse welding and severing device 5. The two draw rollers 8, 9 are then pressed against one another, the foil 2 released from rod 48 and the latter lifted by means of chains 19 over the transverse welding and severing device 5. The jaws 31, 32 are then clamped together to hold the foil tubing 2 between them and simultaneously sever it at its leading end. Shortly thereafter the draw rollers 8, 9 are temporarily drawn apart and the rod 48 taken back between them and around the divert roller 50.

Two guide rollers 51 may be provided beneath the draw roller 8 to ensure that the leading end 2a of the foil tubing 2 has a guaranteed position when the bars 4 apply suction thereto and open. To prevent these guide rollers 51 obstructing the introduction of a fresh length of foil tubing 2 they are mounted at the free ends of levers 52 which are pivotable about pivots 53.

The bars 4 with suction openings can readily be replaced by other gripping means of known form which can be opened and closed in controlled fashion.

In a further embodiment of the device according to the invention the upper starting position of the bars 4 may be located beneath the transverse welding and severing device 5 and, each time the latter is operated, the foil tubing 4 can be drawn forward by the draw rollers 8, 9 a predetermined amount so that the leading end 2a of the tubing can be gripped by the bars 4.

We claim:

1. In an apparatus for wrapping bulky objects or stacked groups of objects in packaging foils including a conveyor device for conveying the objects into the apparatus for temporary arrest therein, and a feed device for (feeding-in) a continuous length of foil tubing, the improvement comprising a foil transporting means for engaging the leading end of the infed foil tubing, for opening this end to a cross-section greater than the corresponding area of the objects on the conveyor device, and for drawing the opened end of the tubing a preselectable amount over said objects, and including a foil transverse welding and severing device arranged after said feed device and having means for applying a transverse seam to the foil tubing above said objects and for severing said tubing above this transverse seam, control means for controlling said foil transporting means for performing the transporting operation in two steps, and for operating the transverse welding and severing device between these two steps for the application of the transverse welding seam and the severing of the foil tubing.

2. Apparatus according to claim 1, further comprising an adjustably-positioned first switch which is operable by said transporting means, after it has performed one step of the transporting operation, to stop said transporting means and initiate the operation of said transverse welding and severing device.

3. Apparatus according to claim 2, characterized by the fact that there is arranged beyond said first switch a second adjustably-positioned switch operable by the transporting means on completion of the second step of the transporting operation to effect the termination of said operation.

4. Apparatus according to claim 1, in which said means engaging the leading end of the infed foil tubing comprises two parallel bars with suction openings connected to a suction pump through a control valve.

5. Apparatus according to claim 1, in which the foil transporting means further comprise pairs of chains in vertically-disposed, parallel loops arranged in mirror image fashion centrally of the conveyor device and of the objects standing ready for wrapping on the conveyor device, the upper parts of said pairs running at a small distance below said feed device and the lower parts of said pairs running at a greater distance above said conveyor device.

6. Apparatus according to claim 5, in which said chains run beneath the feed device first downwards and apart and then temporarily towards one another, and in which said transverse welding and severing device is arranged in this locality.

7. Apparatus according to claim 6, in which said feed device comprises a pair of draw rollers which can be opened and closed, a pre-winding arrangement disposed in advance of said draw rollers, and a pilot rod having means for engaging the end of a length of foil tubing and being secured to one of said chains and disposed parallel to the axis of said draw rollers, said pilot rod being movable from said prewinding arrangement, between the opened draw rollers to at least said transverse welding and severing device to introduce the leading end of a new length of foil tubing into effective position in the apparatus.

* * * * *